T. SCHOU.
RUNNER ATTACHMENT FOR VEHICLES.
APPLICATION FILED NOV. 3, 1910.
998,406.
Patented July 18, 1911.
2 SHEETS—SHEET 2.
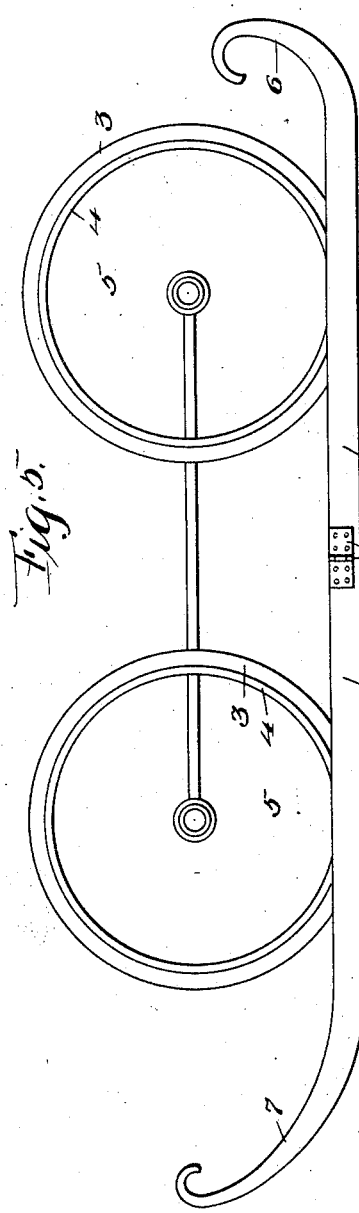
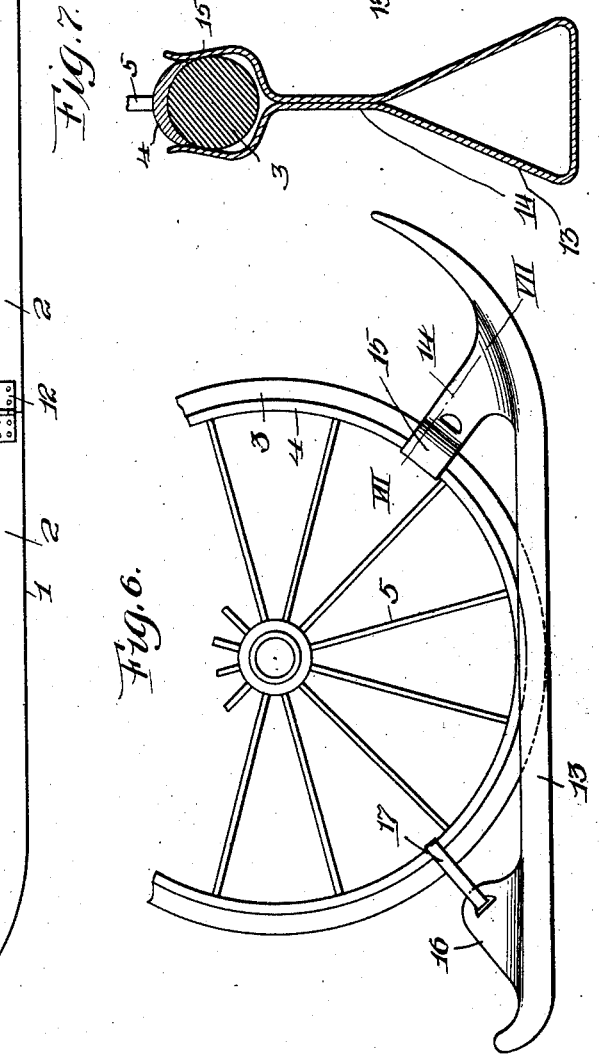

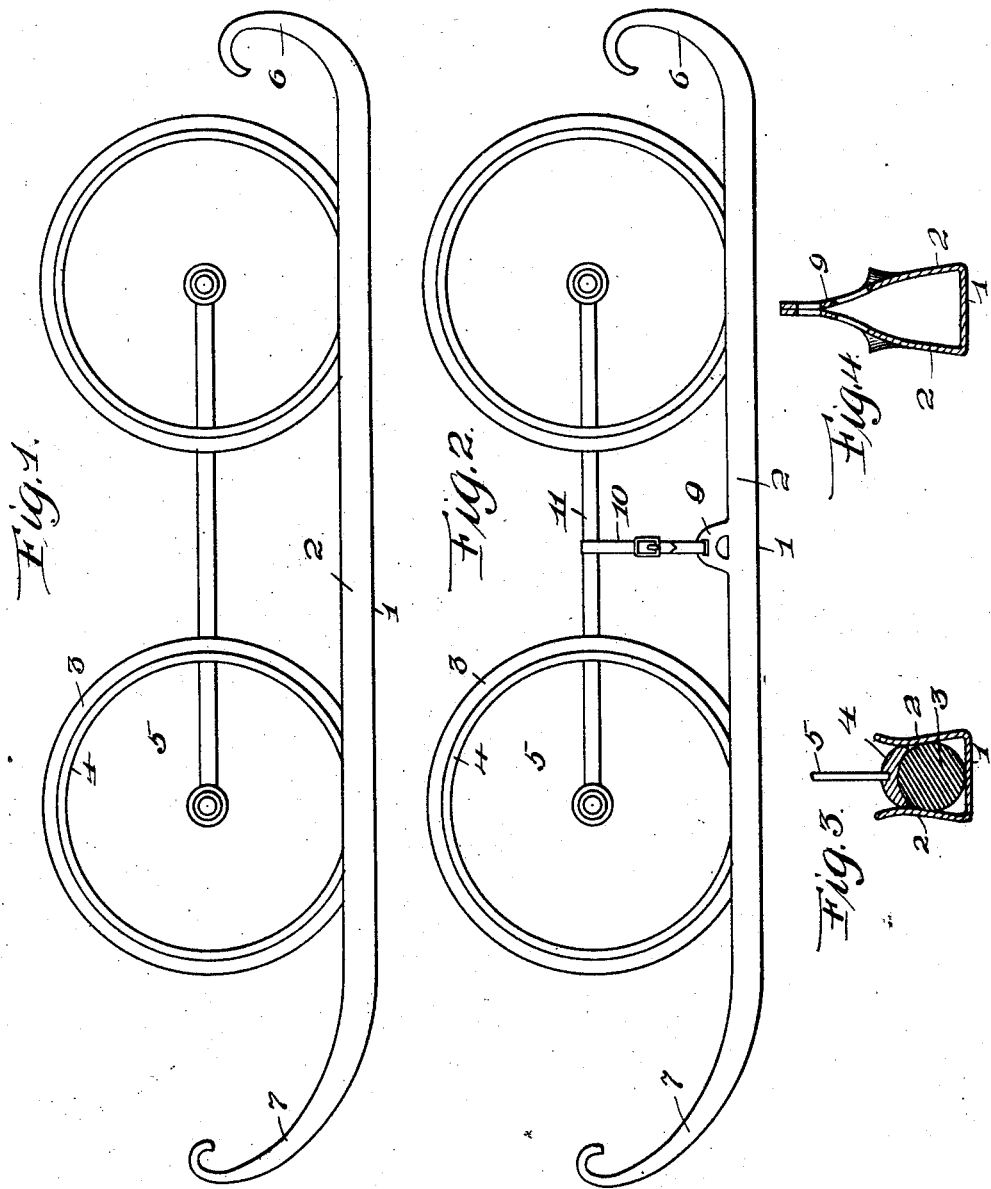

UNITED STATES PATENT OFFICE.

THEODOR SCHOU, OF PITTSBURG, PENNSYLVANIA.

RUNNER ATTACHMENT FOR VEHICLES.

998,406.　　　　　Specification of Letters Patent.　　Patented July 18, 1911.

Application filed November 3, 1910. Serial No. 590,426.

*To all whom it may concern:*

Be it known that I, THEODOR SCHOU, a subject of the King of Norway, residing at Pittsburg, in the county of Allegheny and State of Pennsylvania, have invented certain new and useful Improvements in Runner Attachments for Vehicles, of which the following is a specification, reference being had therein to the accompanying drawing.

This invention relates to runner attachments for vehicles, and more particularly to baby carriages, go-carts and light wheeled vehicles.

The object of the invention is to provide means in a manner as will be hereinafter set forth whereby a baby carriage can be readily and rapidly converted from a wheeled vehicle into a sleigh, and as conveniently reconverted from a sleigh back to a wheeled vehicle, without resorting to an expensive device.

Another object of the invention is to provide runners that can be used in connection with various sizes of baby carriages, the runners being constructed to accommodate a maximum size and consequently can be used for baby carriages varying from the maximum to the minimum.

A further object of this invention is to provide a runner attachment for wheels that can be easily and quickly sprung into engagement therewith without resorting to additional fastening means for holding the runners.

A still further object of this invention is to provide a runner attachment for wheels that can be folded and easily carried.

A still further object of this invention is to provide a runner that can be readily attached to road sleds or used by juveniles as a sort of skate.

A still further object of the invention is to provide individual runners for wheels that can be advantageously used in connection with large vehicles, particularly those of that type having widely separated wheels.

These and such other objects as may hereinafter appear are attained by the novel construction, combination and arrangement of parts to be hereinafter specifically described and then claimed.

Reference will now be had to the drawing forming a part of this specification, wherein there are illustrated the preferred embodiments of the invention, but it is to be understood that the structural elements thereof can be varied or changed without departing from the spirit and scope of the invention.

In the drawing:—Figure 1 is a side elevation of one of the runners, Fig. 2 is a similar view of a modified form of runner, Fig. 3 is a cross sectional view of the preferred form of runner shown in Fig. 1, Fig. 4 is a cross sectional view of the modified form of runner shown in Fig. 2, Fig. 5 is an elevation of a further modified form of runner, Fig. 6 is a similar view of still a further modified form of runner, Fig. 7 is a cross sectional view taken on the line VII—VII of Fig. 6, and Fig. 8 is an enlarged cross sectional view of the runner.

A runner in accordance with this invention is constructed of an oblong strip of resilient or malleable metal bent to form a channel bar having a flat bottom 1 and the side walls thereof bent inwardly, as at 2 in order to frictionally grip the tire 3 or felly 4 of a wheel 5. The ends of the strip of metal are preferably tapered, whereby they can be easily bent upwardly, as at 6 and 7. The forward bent end of the runner is described upon a greater curve to facilitate the mounting of obstructions and insure an easy movement of the runner upon snow or ice.

In the modification shown in Fig. 2 of the drawing, the runner at a point approximately intermediate the ends thereof has the side walls provided with apertured lugs 9, which are bent inwardly, and these lugs are adapted to be connected by straps 10 or other fastening means to the framework 11 of the baby carriage.

A further modification of the invention is shown in Fig. 5 of the drawing, wherein the runner is made in two sections hinged or pivotally connected together by hinged members 12 allowing the sections of the runner to be folded sidewise together, thus permitting of the runners being easily handled, carried or stored away when not in use.

In Fig. 6 of the drawings there is shown an individual runner, designated 13, said runner having a cross sectional shape corresponding to the preferred form of runner. The individual runner besides frictionally gripping the tire or felly of the wheel can have the ends thereof connected to the periphery of the wheel, and this can be accomplished in two ways. First, the side walls of the runner adjacent to the ends thereof can be provided with angularly disposed lugs 14 bent together, and then bent to frictionally grip the wheel, as at 15. In lieu of the lugs 14 apertured lugs 16 can be provided, as best shown upon the opposite end of the runner, and these lugs connected to the periphery of the wheel by straps or other fastening means 17.

From the foregoing it will be observed that the device can be easily applied to a baby carriage to convert the same into a sleigh, that the runners prevent dirt and other matter from soiling the wheels, and that they have been designed upon such lines as to be easily manufactured.

What I claim is:—

A runner attachment for a wheeled vehicle, consisting of a single sheet of channel shaped metal having the ends thereof curved upwardly and the side walls thereof bent inwardly toward each other and intermediate the top and bottom thereof curving inwardly to frictionally engage the wheels of the vehicle.

In testimony whereof I affix my signature in the presence of two witnesses.

THEODOR SCHOU.

Witnesses:
   CHRISTINA T. HOOD,
   EVA A. MILNE.

---

Copies of this patent may be obtained for five cents each, by addressing the "Commissioner of Patents, Washington, D. C."